(12) United States Patent
Handley

(10) Patent No.: US 6,778,679 B1
(45) Date of Patent: Aug. 17, 2004

(54) METHOD FOR STEGANOGRAPHIC DECODING

(75) Inventor: John C. Handley, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 582 days.

(21) Appl. No.: 09/721,224

(22) Filed: Nov. 22, 2000

(51) Int. Cl.$^7$ ................................................ G06K 9/00
(52) U.S. Cl. .................................................. 382/100
(58) Field of Search ............................. 382/100, 232; 348/211.5, 460; 358/3.28; 713/161, 169, 170, 171, 176, 177, 179; 380/1, 223, 278, 286; 340/5.53, 5.83

(56) References Cited

U.S. PATENT DOCUMENTS

| | | | | |
|---|---|---|---|---|
| 5,859,920 A | * | 1/1999 | Daly et al. .................... | 382/115 |
| 6,070,800 A | * | 6/2000 | Fujita et al. ............ | 235/462.11 |
| 6,094,722 A | * | 7/2000 | Astola et al. ................ | 713/176 |
| 6,285,775 B1 | * | 9/2001 | Wu et al. .................... | 382/100 |
| 6,357,042 B2 | * | 3/2002 | Srinivasan et al. ........... | 725/32 |
| 6,577,744 B1 | * | 6/2003 | Braudaway et al. ........ | 382/100 |
| 6,580,804 B1 | * | 6/2003 | Abe ........................... | 382/100 |
| 6,594,373 B1 | * | 7/2003 | Gustafson ................... | 382/100 |
| 2002/0150276 A1 | * | 10/2002 | Chang ........................ | 382/100 |

* cited by examiner

*Primary Examiner*—Andrew W. Johns
*Assistant Examiner*—Shervin Nakhjavan

(57) ABSTRACT

A method is presented for decoding auxiliary information in digital images which enables the encoding of both compact auxiliary information specific to a given image and a secret message into a given image such that the hidden message contained therein is only revealed in such a way that neither the image itself nor the auxiliary information alone are sufficient to reveal the secret message. Specifically, a method for decoding an auxiliary message in a digital image, having the steps of first receiving a function F through secure means; then, for each pixel (i,j) in digital image (D) obtaining a N×N windowed observation; applying function F to said N×N windowed observation; marking a corresponding pixel in message (I) with the value obtained from function F; and then writing out the hidden message.

2 Claims, 4 Drawing Sheets

```
This is a secret message for your eyes only
```

METHOD FOR STEGANOGRAPHIC DECODING

RELATED APPLICATIONS

This invention is related to co-pending US Application Ser. No. 09/561,609, entitled "METHOD FOR GENERATING SHIFT-INVARIANT FILTERS" and Ser. No. 09/561,608, entitled "A METHOD TO PROGRAM A NONLINEAR FILTER"; and Ser. No. 09/746,869, entitled "LOOSE GRAY SCALE TEMPLATE MATCHING" and Ser. No. 09/721,256, filed concurrently herewith, entitled "METHOD FOR STEGANOGRAPHIC ENCODING".

FIELD OF THE INVENTION

This invention is related to methods for decoding auxiliary information in digital images and, more particularly, to methods for steganographic decoding.

BACKGROUND OF THE INVENTION

In today's world, increasing numbers of documents are being scanned in large quantities or are being created electronically and forwarded to another party through electronic means. Often it is of utmost importance that the contents of the document not be seen by third parties who may have access to the message become apparent to the intended recipient.

If a key is needed to decode the information then the intended recipient must have access to the key to see the image or read the text encoded therein. Since the key is independent of the document itself, third parties who may have gained access to the decoding key will also be able to read the document as well. The idea of having a separate key to encode and decode documents is well known in the arts.

This is known as steganography wherein one invisibly embeds a message into an image or signal and provides a key (often referred to as a stego-key) to the intended recipient through a secure channel. Upon receiving the image, the recipient applies the key to the image though a known algorithm to extract the message. A relatively thorough survey of this field of art can be found in "*Information Hiding: Techniques for Steganography and Digital Watermarking*", edited by S. Katzenbeisser and F. A. P. Petitcolas, Artech House Publishers, 2000 wherein, information can be hidden in an image by manipulating the image's content so that no alteration thereof can be detected by the human visual system but can be detected algorithmically by computer. In other words, the image upon decoding will look unaltered but through computer means it can be determined whether or not the document has been altered somehow between the sender and the recipient's receipt of the document. Several steganographic applications are known including use for copyright protection wherein the owner's personal mark is invisibly embedded into the transmitted image.

What is needed in the art and to which the present invention is directed toward a method of using a key to associate a message with the document itself without altering the image contained therein.

SUMMARY OF THE INVENTION

What is presented is a method which would then enable a digital image to act as a carrier of hidden or secret information. In particular, the present invention presents a method in which a message is hidden using compact auxiliary information derived from a given image and a given message, such that when the information is applied to the given image, the hidden message is revealed in such a way that neither the image itself nor the auxiliary information is sufficient to reveal the message. Through an application of the present invention, only through the combination of the image and the auxiliary information specific to that image can the hidden or secret message be revealed.

Specifically, a method for decoding an auxiliary message in a digital image, having the steps of first receiving a function F through secure means; then, for each pixel (i,j) in digital image (D) obtaining a N×N windowed observation; applying function F to said N×N windowed observation; marking a corresponding pixel in message (I) with the value obtained from function F; and then writing out the hidden message.

Other objects, advantages, and salient features of the invention will become apparent from the detailed description which, taken in conjunction with the drawings, disclose the preferred embodiments of the invention.

BRIEF DESCRIPTION OF THE DRAWINGS

The accompanying drawings, which are incorporated in and form part of the specification, illustrate an embodiment of the present invention and, together with the description, serve to better explain the operation features, and advantages of the invention. It should be understood, however, that the invention is not limited to the precise arrangements and instrumentalities shown.

DETAILED DESCRIPTION OF THE INVENTION

The invention disclosed herein is a method for encoding and decoding auxiliary information in digital images. In particular, the present invention is a method of hiding a message within the document itself without altering the image contained therein which would then enable virtually any digital image to act as a carrier of hidden or secret information. A method is presented which enables the encoding of both compact auxiliary information specific to a given image and a secret message into a given image such that the hidden message contained therein is only revealed in such a way that neither the image itself nor the auxiliary information alone are sufficient to reveal the secret message.

Specifically, a method is presented for decoding an auxiliary message in a digital image, having the steps of first receiving a function F through secure means; then, for each pixel (i,j) in digital image (D) obtaining a N×N windowed observation; applying function F to said N×N windowed observation; marking a corresponding pixel in message (I) with the value obtained from function F; and then writing out the hidden message.

Figures 1, 2:
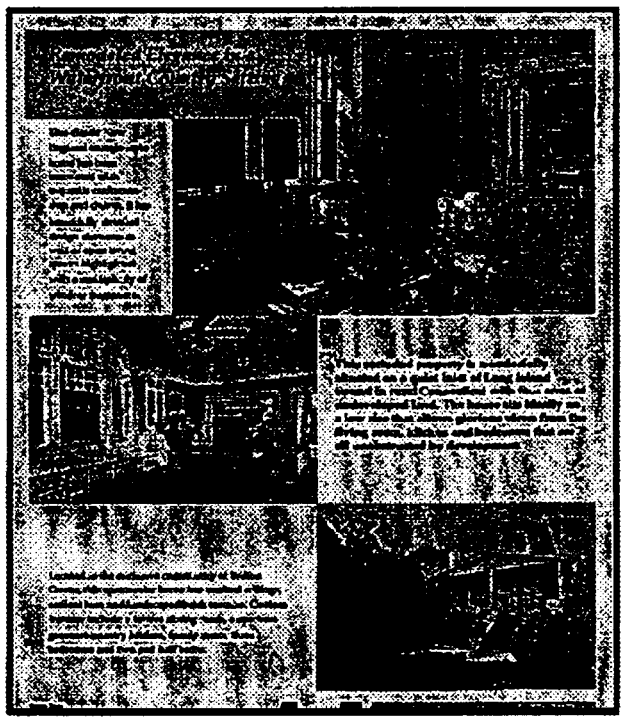
FIG. 1 is an example document intended to be transmitted securely to another party wherein a gray scale document image is given an array of values between 0 and 255, inclusive.
FIG. 2 illustrates a sample secret message to be encoded into the document of FIG. 1, which is a binary image, represented by an array of two values, 0 for black and 255 for white.
Figure 3:
FIG. 3 illustrates the document of FIG. 1 embodied with the secret message of FIG. 2 wherein the result of processing the document image of FIG. 1 with the templates produced generated by present invention is shown.

FIG. 1 is an example document intended to be transmitted securely to another party. FIG. 2 illustrates a sample secret message to be encoded into the document of FIG. 1. When the method of the present invention is applied to the given image of the document of FIG. 1 (and only the given image), the hidden message contained therein can be revealed. Specifically, a tree-structured classifier is trained using the method of the present invention on data from the document's image and the message to be hidden within the image. The resulting tree classifier produced by the present invention generated a tree with 1552 leaves that, when applied to the document image, uncovered the message, as illustrated in FIG. 3, wherein the secret message is clearly visible. The tree-structured classifier may be stored, but in the preferred embodiment, the tree is converted into a list of templates by following each branch of the tree to its leaf and collecting the decisions made along the way.

Encoding a hidden or secret message using the method of the present invention requires a document image and a message image. Through the application disclosed herein, an output set is generated which is a set of data (a stego-key), such that when applied to the image, produces a further image containing the visible secret message. The original image is never altered. The secret message is not readily detectable from the stego-key. The message is only recoverable through the combination of the original image and stego-key.

In the preferred embodiment, the stego-key is determined by training a tree-structured classifier where the training data are spatial samples of the image and pixel values from the message image. In the preferred embodiment, training sets are generated from all 3×3 windowed observations of document image D and message image I: $A0=D(i-1,j-1)$, $A1=D(i, j-1)$, $A2=D(i+1, j-1)$, $A3=D(i-1, j)$, $A4=D(i, j)$, $A4=D(i, j)$, $A5=D(i+1, j)$, $A6=D(i-1, j+1)$, $A7=D(i, j+1)$, $A8=D(i+1, j+1)$, $Y=I(i,j)$, for each pixel $(i, j)$ in the message image. This creates a list L of training vectors having the form (A0, A1, A2, A3, A4, A5, A6, A7, A8, Y). A tree-structured classifier is then trained on this image data.

The preferred embodiment uses the program C4.5 by J. Ross Quinlan which is described in "C4.5, Programs for Machine Learning", Morgan Kaufmann, San Mateo, Calif., 1988 which is incorporated herein for its teachings by reference being made thereto. One skilled in this art should also be made aware that other training methods are possible including "CART (Classification and Regression Trees", Breiman, et al., Wadsworth, Belmont., Calif., 1984 which is also incorporated herein. These are commercially available software packages. One skilled in this art may also implement one's own algorithm using the theory of recursive partitioning.

Briefly, in the preferred embodiment, a tree structured classifier takes a vector as input and outputs a value which is trained on the list L described above. The tree structured classifier takes a 3×3 pixel observation of the original image and outputs a pixel value corresponding to the message image. Although the preferred embodiment uses a tree-structured classifier, any statistical classification or multi-variate regression technique could be used. What is required is to estimate a function F: F(A0, A1, A2, A3, A4, A5, A6, A7, A8)=Y for all (A0, A1, A2, A3, A4, A5, A6, A7, A8, Y) in the training set. When the above described function F is applied to each 3×3 windowed observation of the original document image, the secret message is recovered. The function F may be a binary decision tree or computer code for an artificial neural network or a representation of a maximum-likelihood classifier or a k-nearest neighbor classifier. When F is applied to any image other than one similar to the document image D, no message appears because F is the stego-key to the message and is specific to the intended document. To recover the message with F but not D would require testing a relatively large and prohibitive number of images against F until a legible message appeared (although the message itself could be a random pattern and not obviously a message).

Figure 4:
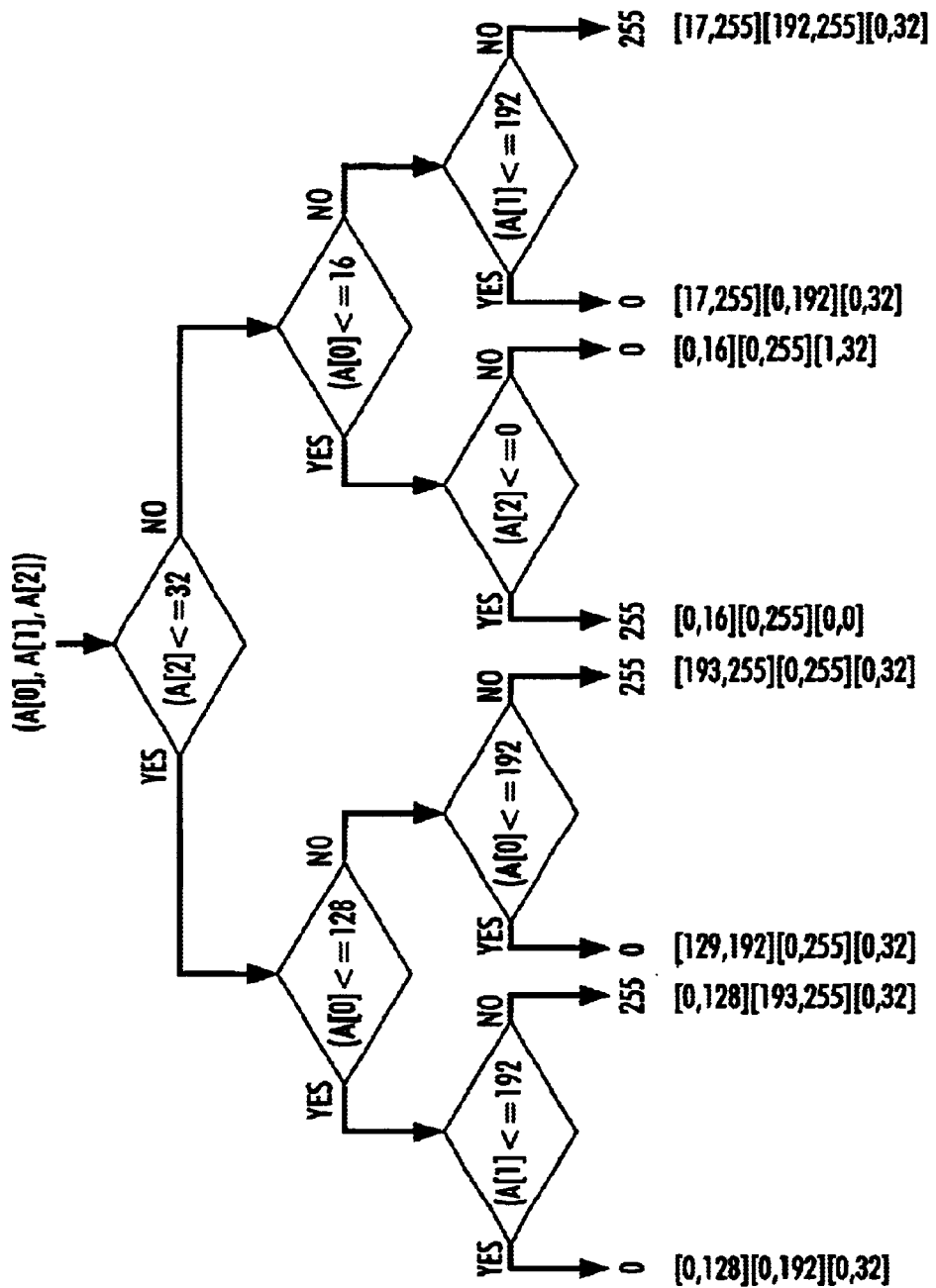
FIG. 4 is an example decision tree and templates corresponding to each branch of said tree.
Figure 5:
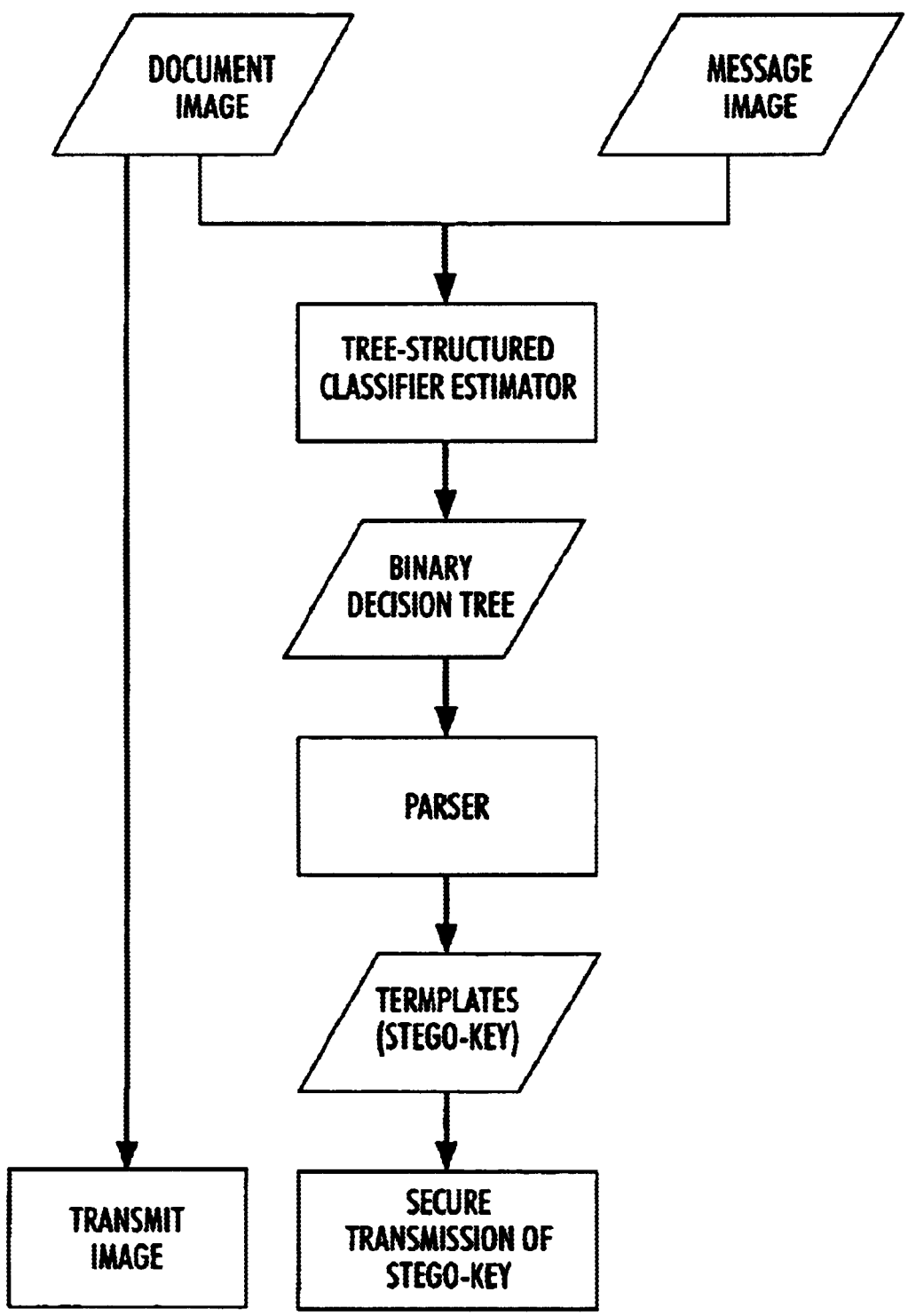
FIG. 5 illustrates the flowchart of the encoding system of the preferred embodiment of the present invention which shows a partial list of templates that is equivalent to the binary tree, part of which is shown in FIG. 4.

The method of the present invention involves the step of first obtaining a document image and a secret message intended to be contained therein (FIG. 1 and FIG. 2). Next, the method has the step of forming a training set from all 3×3 windowed observations of document image D and message image I wherein $A0=D(i-1,j-1)$, $A1=D(i, j-1)$, $A2=D(i+1, j-1)$, $A3=D(i-1, j)$, $A4=D(i, j)$, $A5=D(i+1, j)$, $A6=D(i, j+1)$, $A7=D(i, j+1)$, $A8=D(i+1, j+1)$, $Y=I(i,j)$., for each pixel $(i, j)$ in the message image, to create a list of training vectors having the form (A0, A1, A2, A3, A4, A5, A6, A7, A8, Y). Next, using a recursive partitioning, estimating a binary decision tree T from the training set of all 3×3 windowed observations wherein each node of the tree has a decision of the form: if($Xk <=a$) follow next link to the left, else follow next link to the right. The leaves of the tree T are gray image values (say 0 or 255). FIG. 4 illustrates a portion of a tree expressed in the 'C' programming language and FIG. 5 illustrates an example tree expressed as a flow chart. The next step of the method of the present invention involves, in tree T, following each branch to its leaf to generate a conjunctive list of decisions that were satisfied for that branch. FIG. 5 illustrates a binary decision tree expressed as a flow chart with templates for each tree branch and pseudo-code is provided herein to facilitate this. The next step involves the step of writing out the conductive list as a list of templates, a list of which output templates is also provided herein for analysis. The list of templates along with the document image now serves as a secret representation of the message image. When all templates are operated on all pixels of the input image, the message is revealed in the output image of FIG. 3.

While the preferred embodiment uses 3×3 observation windows, one may use windows of other sizes and configurations. The collection of templates along with the image is all that is needed to uncover the message. Neither alone is sufficient. The image is never altered. Without the original image, one would have to search over a prohibitive combination of 3×3 matrices for each template to generate candidate message images. While the preferred embodiment is shown for gray-scale images, it can also be done for images with more than one channel (e.g., color).

It should be understood that one can also associate other digital values to an image other than another image and that one can associate audio signals with an image by sampling the image a predefined sequence, each spatial sample corresponding to audio sample value in sequence. The audio message is retrieved by operating the trained function on the image in the same predefined sequence, the output function values are then assembled in sequence and processed into audible sounds. Such extensions of the present invention are anticipated herein and should be considered encompassed by its scope.

Although a binary decision tree is used in this embodiment, other functions known in the art can be used.

In general, from image D and message I, we obtain a training set consisting of samples of D and I. Let A(i,j) be the vector of observations of D centered at (i,j). Let L={A(i,j), I(i,j)} be the training set. The training step means finding a function F such that F(A(i,j)) is statistically close to I(i,j) for all pixel positions (ij) in I. Function F may be obtained by many means known the art, and can take the form of a neural network, a decision tree, a generalized linear regression function, a maximum likelihood classifier, or a k-nearest neighbor classifier "Pattern Recognition and Neural Networks", B. D. Ripley, Cambridge University Press, 1995) for a thorough explanation of these techniques. In the art, these technologies are known as classification, pattern recognition or regression techniques and all involve some sort of statistical estimation. The present invention in general applies these techniques to steganography wherein the stego-key is the estimated function F that maps image D to message image I where F can be represented in an obfuscated or even encrypted way such that it would be prohibitively expensive to extract message I from F since it would require operating F on each possible image D: F(D). Only an infinitesimal proportion of images D would produce anything remotely readable and it is nearly impossible to check them all owing to the astronomical number of possible images D.

The preferred embodiment uses the C4.5 tree structured classifier and further expresses the resulting binary decision tree in the 'C' computer programming language as shown. One skilled in this art should readily understand how to convert a tree-structured output into code as shown therein. The tree expressed in 'C' code is further expressed as a set of conjunctive intervals as shown below. The techniques used to parse the tree are known in the art and one skilled in this art should be readily familiar with programming techniques directed to tree parsing. The preferred embodiment herein uses the UNIX utilities Lex and Yacc, the pseudo-code of which is provided herein.

Below is the first part of the binary decision tree in 'C' language format:

```
/*DecisionTree:*/
#include<stdio.h>
int classify(float*A,int len){
int class;
if(len>9)fprintf(stderr,"!!Too many features.\n");
if(A[7]<=160)
{if(A[8]<=44)
{if(A[0]>139){return 255;}
if(A[0]<=139)
{if(A[0]<=88){return 255;}
if(A[0]>88)
{if(A[6]<=134)
{if(A[5]<=72){return 255;}
if(A[5]>72)
{if(A[5]<=78)
{if(A[0]>101){return 255;}
if(A[0]<=101)
{if(A[4]<=75) {return 255;}
if(A[4]>75) {return 0;}}}
if(A[5]>78){
if(A[5]<=93){return 255;}
if(A[5]>93)
```

Shown below is a portion of the templates from the above examples.

[A0:118,153][A1:86,153][A2:86,146][A3:86,136][A4:87, 255][A5:75,154][A6:145,146][A7:138,160][A8:131,138] 0

[A0:200,203][A1:200,203][A4:0,202][A5:0,202][A6:202, 204][A7:200,204][A8:202,255] 0

[A0:118,121][A1:113,153][A2:86,121][A3:86,107] [A4:109,255][A5:75,154][A6:83,146][A7:87,160] [A8:85,130] 0

[A0:89,101][A4:76,255][A5:73,78][A6:0,134][A7:0,160] [A8:0,44] 0

[A0:159,255][A1:207,255][A3:204,255][A7:0,160][A8:45, 152] 0

[A0:118,153][A1:86,153][A2:86,121][A3:86,132][A4:87, 108][A5:75,154][A6:83,146][A7:118,160][A8:85,130] 0

[A0:159,255][A1:203,255][A3:0,203][A4:202,255][A6:0, 157][A7:0,160][A8:156,255] 0

A preferred embodiment of the encoding method of the present invention has the following steps Step 1: Obtain document image and message image.

Step 2: Form training set from all 3×3 windowed observations of document image D and message image I: D(i−1,j−1), D(i, j−1), D(i+1, j−1), D(i−1, j), D(i, j), D(i+1, j), D(i−1, j+1), D(i, j+1), D(i+1, j+1), I(i,j)., for each pixel (i, j) in the message image. This creates a list of training vectors of the form (A0, A1, A2, A3, A4, A5, A6, A7, A8, Y).

Step 3: Using recursive partitioning or other method, estimate a binary decision tree T from the training set. Each node of the tree has a decision of the form: if (Ak<=a) follow next link to the left, else follow next link to the right. The leaves of the tree T are gray image values (say 0 or 255).

Step 4: In tree T, follow each branch to its leaf to generate a conjunctive list of decisions that were satisfied for that branch.

Step 5: Write out the conjunctive list as a list of templates. The list of templates along with the document image now serve as a secret representation of the message image.

The stego-key is a list of templates of the form: [A0:L0, U0] [A1:L1,U1] [A2:L2,U2] [A3:L3,U3] [A4:L4,U4] [A5:L5,U5] [A6:L6,U6] [A7:L7,U7] [A8:L8,U8] b. This is interpreted as follows. At a pixel (i,j) in document image D, observe, in a 3×3 window, the values A0=D(i−1, j−1), A1=D(i, j−1), A2=D(i+1, j−1), A3=D(i−1,j), A4=D(i,j), A5=D(i+1, j), A6=D(i−1,j+1), A7=D(i, j+1), A8=D(i+1, j+1) about the pixel (i,j). For a given template, the following logical test is performed: if L0<=A0<=U0 AND L1<=A1<= U1 AND L2<=A2<=U2 AND L3<=A3<=U3 AND L4<= A4<=U4 AND L5<=A5<=U5 AND L6<=A6<=U6 AND L7<=A7<=U7 AND L8<=A8<=U8, then mark the pixel (i,j) in the output image I with value b: I(i,j)=b. We will call b the value of the template. In the example above, there were 1552 templates of this form.

The templates in a stego-key are disjoint in the sense that a given 3×3 observation (A0, A1, A2, A3, A4, A5, A6, A7, A8) satisfies one and only one template. Thus in the example, for each 3×3 observation of D, it satisfied one and only one of the 1552 logical tests.

To recover the secret message, the templates are applied to the document image D in the following way: for each pixel (i,j) in document image D, each template in the stego-key is applied to it. Let b be the value of the unique template satisfying the logical test: L0<=A0<=UO AND L1<=A1<=U1 AND L2<=A2<=U2 AND L3<=A3<=U3 AND L4<=A4<=U4 AND L5<=A5<=U5 AND L6<=A6<= U6 AND L7<=A7<=U7 AND L8<=A8<=U8. Then, mark pixel (i,j) in I with b: I(i,j)=b. When all templates are operated on all pixels of the input image, the message is revealed in the output image (as in FIG. 3). While the preferred embodiment uses 3×3 observation windows symmetrically arranged about a pixel, one may use windows of other sizes and configurations.

In summary, a method is presented for decoding auxiliary information in digital images which enables the encoding of both compact auxiliary information specific to a given image and a secret message into a given image such that the hidden message contained therein is only revealed in such a way that neither the image itself nor the auxiliary information alone are sufficient to reveal the secret message. Specifically, a method for decoding an auxiliary message in a digital image, having the steps of first receiving a function F through secure means; then, for each pixel (i,j) in digital image (D) obtaining a N×N windowed observation; applying function F to said N×N windowed observation; marking a corresponding pixel in message (I) with the value obtained from function F; and then writing out the hidden message.

The foregoing description of the invention has been presented for purposes of illustration and to describe the best mode known for implementing of the invention. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and any examples be considered as exemplary only, with the true scope and spirit of the invention being indicated in the following claims.

What is claimed is:

1. A method for decoding an auxiliary message in a digital image, comprising:

a) receiving a logical test function F through secure means;

b) for each pixel (i,j) in said digital image obtaining a N×N windowed observation (A0 . . . A8);

c) applying said logical test function F to said N×N windowed observation said logical test comprising: L0<A0<U0 AND L1<A1<U1 AND L2<=A2<=U2 AND L3<=A3<=U3 AND L4<=A4<=U4 AND L5<=A5<=U5 AND L6<A6<=U6 AND L7<=A7<=U7 AND L8<=A8<4J8;

d) marking a corresponding pixel in message with the value obtained from said logical test; and e) writing out the hidden message.

2. A method for decoding a hidden message associated with a digital image, comprising:

a) receiving a set of Templates through a secure means;

b) for each pixel (i,j) in said digital image obtaining a N×N windowed observation (A0 . . . A8);

c) for each Template [L0,U0] . . . L8,U8J] applying a logical test to said Template to the N×N windowed observation and comprising: L0<A0<U0 AND L1<A1<U1 AND L2<=A2<=U2 AND L3<=A3<=U3 AND L4<=A4<=U4 AND L5<=A5<=U5 AND L6<A6<=U6 AND L7<=A7<=U7 AND L8<=A8<4J8;

d) in each instance wherein said logical test is TRUE, marking pixel (ij) in said message; and writing out the hidden message.

* * * * *